Aug. 22, 1933.     I. E. McCABE     1,923,681
SOLENOID OPERATED VALVE
Filed June 15, 1931     2 Sheets-Sheet 1
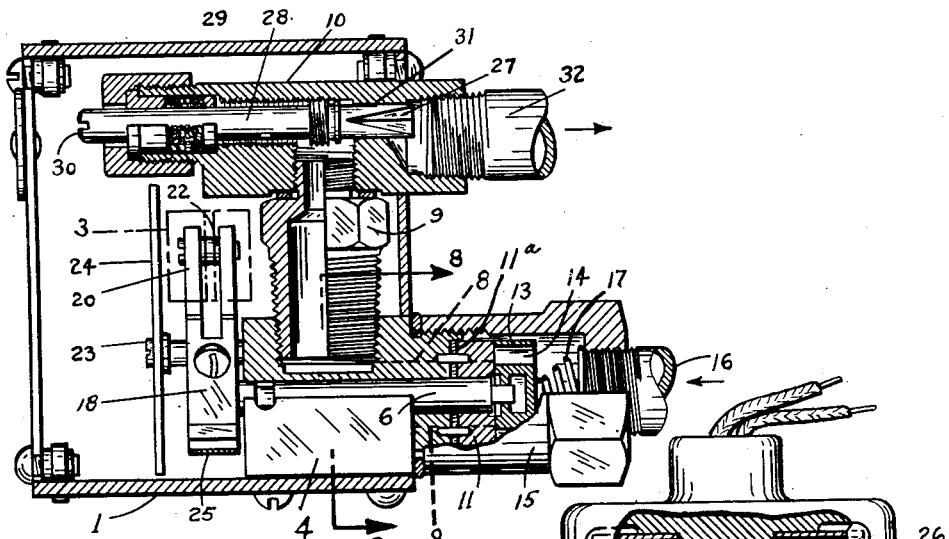
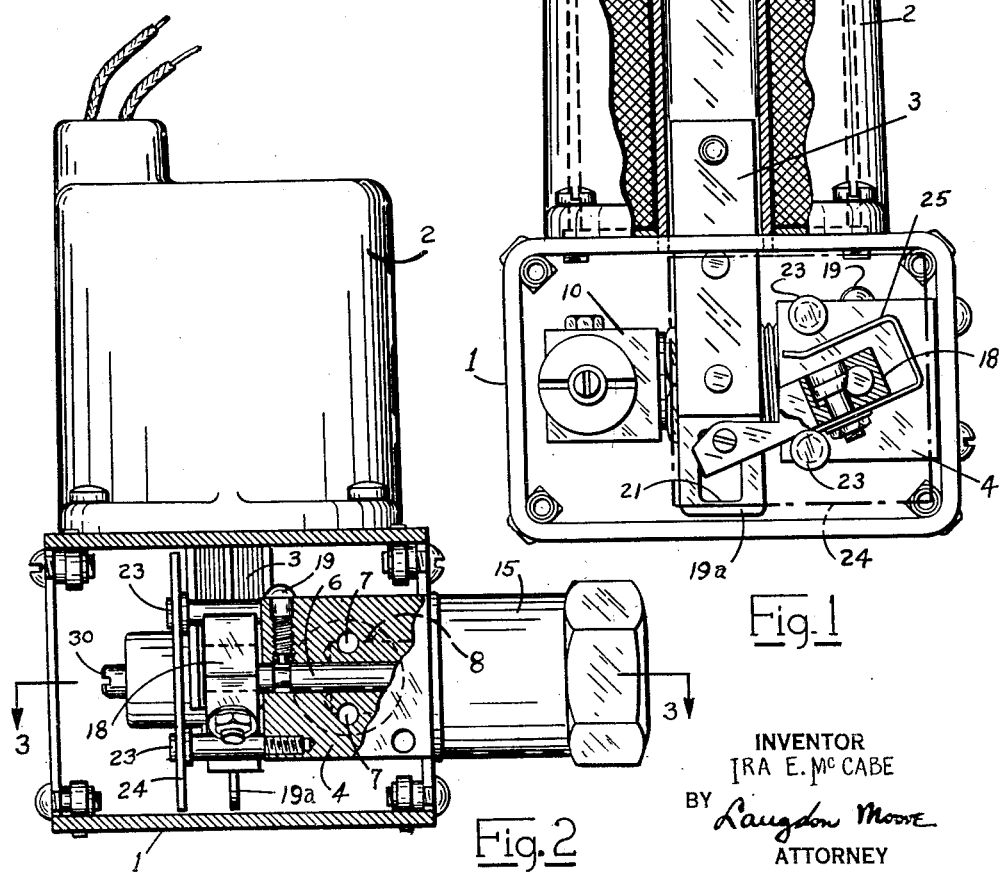
INVENTOR
IRA E. McCABE
BY Langdon Moore
ATTORNEY Aug. 22, 1933.　　　　I. E. McCABE　　　　1,923,681
SOLENOID OPERATED VALVE
Filed June 15, 1931　　　2 Sheets-Sheet 2

INVENTOR
IRA E. McCABE
BY Langdon Moore
ATTORNEY

Patented Aug. 22, 1933

1,923,681

UNITED STATES PATENT OFFICE 1,923,681

SOLENOID OPERATED VALVE

Ira E. McCabe, Chicago, Ill.

Application June 15, 1931. Serial No. 544,517

3 Claims. (Cl. 137—139)

This invention relates to improvements in valve mechanism and more particularly to a solenoid operated valve.

It is an object of this invention to provide an electrically operated valve of particular advantage for use in connection with automatic electrical controls for fluid fuel burner, although it may be employed with advantage when used for other purposes. It is preferable to construct such a valve having a seat of hard metal with a valve head of similar metal to rotate in contact with the seat and the contacting parts ground and lapped in a manner similar to that employed in the well known Johansson gauges.
When the fluid fuel controlled by the valve is viscous, the valve parts are liable to adhere or stick between operation and it is one of the objects of this invention to so connect the core of the solenoid to the valve head rotating means as to impart a jolt or kick to the mechanism at the beginning of each operation of opening or closing the valve to insure prompt rotation of the disc at all times. Also to provide means to overcome residual magnetism.
Another object of this invention is to provide a solenoid for direct and alternating currents which will possess greater power as the core is drawn within the windings to open the valve than when the valve is held open thereby.
With these and other objects in view, reference is made to the accompanying sheets of drawings which illustrate preferred forms of this invention, with the understanding that minor detail changes may be made without departing from the scope thereof.

In the drawings:

Figure 1 is a view in front elevation, with the front plate removed and the coil cover broken away showing the coil in section, of a form of this invention for use with an alternating current commercial power circuit.

Figure 2 is a view in side elevation of Figure 1, with parts broken away and illustrating a part of the valve casing in section.
Figure 3 is a view in section taken on the line 3—3 looking in the direction of the arrows.

Figures 4, 5, 6, 7:
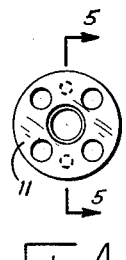
Figure 4 is a plan view of the contacting surface of the valve seat.
Figure 5 is a view in section taken on the line 5—5, Figure 4, looking in the direction of the arrows.
Figure 6 is a plan view of the contacting surface of the valve head.

Figure 7 is a view in section taken on the line 7—7, Figure 6, looking in the direction of the arrows.

Figure 8:
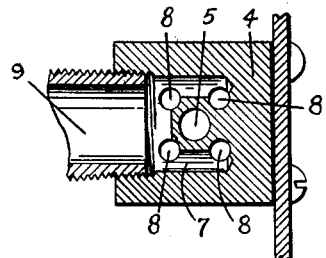

Figure 8 is a view in section of the valve casing taken upon the line 8—8, Figure 3, looking in the direction of the arrows.

Figure 9:
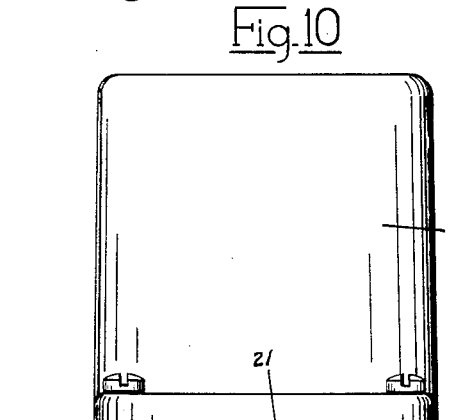

Figure 9 is a view in front elevation, with the front plate removed, of a form of this invention for use more particularly with a direct current commercial power circuit, and showing the position of the parts upon energizing the valve.

Figure 10:
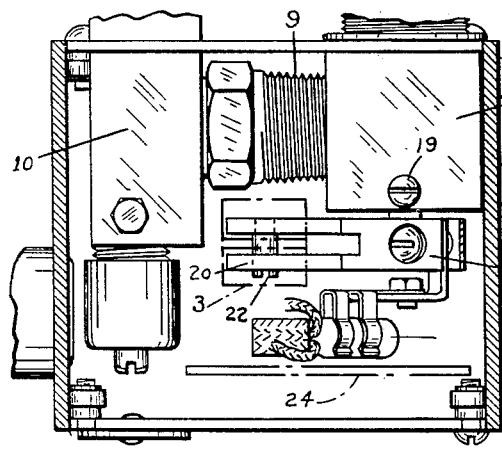

Figure 10 is a view in section taken on the line 10—10, Figure 9, looking in the direction of the arrows.

Figure 11:
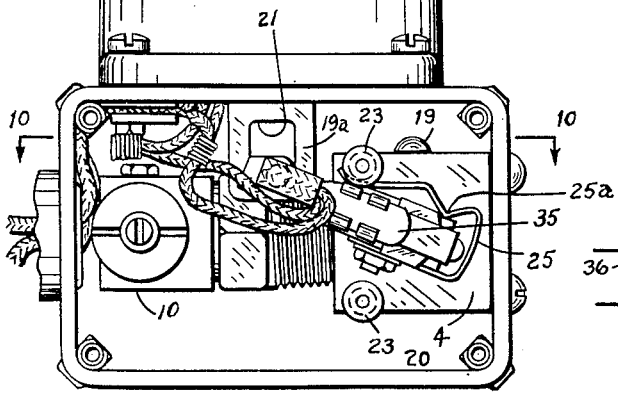

Figure 11 is a wiring diagram of one form of connecting the coils employed in a direct current embodiment of this invention.

Figure 12:
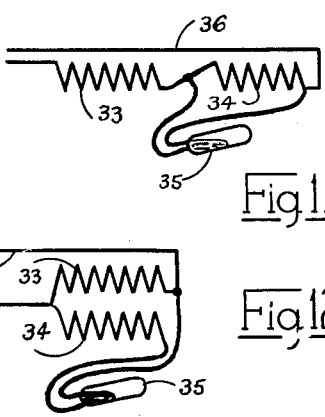

Figure 12 is a wiring diagram of another form of connecting the coils.

In the embodiment of this invention illustrated, the valve casing and valve operating parts are contained within a housing 1 with the coil or coils of the solenoid mounted in a casing 2 received thereabove with the core 3 of the solenoid mounted for reciprocation within the housing 1 and be connected at its lower end to the mechanism for operating the valve. The valve casing comprises a block 4 secured in one corner of the housing 1 and is provided with a central longitudinal bore 5 for receiving a rotatable valve stem 6. The front end of the block 4 is provided with a chamber 7, as shown in Figure 8, which is in communication with four passages 8 arranged parallel and equidistant from the bore 5 and opening through the end of the block, as indicated by dotted lines in Figure 3. It is preferable to connect the chamber 7 in the block 1 by a screw threaded sleeve 9 to the interior of discharge regulating casing 10. The valve casing block 4 extends through the rear wall of the housing 1 and mounts a hard metal valve seat 11 provided with a central bore and four equidistant bores corresponding to the bore 5 and passages 8 in the block 4 and is held in registration therewith by dowels 12. A similarly shaped hard metal valve head 13 provided with four equidistant ports 14 is keyed on the valve stem 6 and is mounted to rotate in contact with the valve seat 11 to bring the ports 14 into and out of register with the passages 8 in the block 4. The valve seat and valve head are enclosed by a housing 15 screw threaded upon the projecting portions of the block 4 and the other end is screw threaded to receive a pipe 16 leading to the source of fluid supply.

The contacting portions of the valve seat 11 and valve head 13 are ground in the same plane and are held against each other by adhesion due to the perfectly flat lapped surfaces and also a coil spring 17 interposed between the head and interior of the housing 15. The opposite end of the valve stem 6 extends beyond the other end of the valve block 4 and is keyed to one end of a valve stem operating arm 18 and is prevented from excessive longitudinal movement in the bore 5 by a set screw 19 in the block 4 entering within a circumferential groove upon the valve stem. The free end of the valve stem operating arm 18 is bifurcated at its free end and is adapted to receive a depending projection 19a of the solenoid core 3 between the bifurcation 20 having an elongated vertical slot 21 and provide a limited movement of the core before acting upon the operating arm 18 by passing a securing member 22 through the bifurcated arms 20 and slot 21 so arranged that when the solenoid core is at the downward end of its travel the top of the slot 21 has actuated the operating arm to rotate the valve stem 6 to close the valve, whereby upon energizing the solenoid the core 3 gains momentum on its upward travel before it engages the arm 18 and thereby imparts a sudden and positive impact upon the arm 18 and likewise upon the valve stem 6 sufficient to free the valve head if it has adhered to the valve seat and insure a prompt and positive opening of the valve as the core 3 ascends. Posts 23 are provided projecting outward from the end of the valve casing block 4 on each side of the intermediate portions of the operating arm 18 to act as stops therefor and also to mount a cover plate 24, if desired. The lower post 23 is engaged by the arm 18 as it reaches the lower end of the movement imparted to it by the normal downward travel of the solenoid core 3. A spring plate 25 is secured to the arm 18 preferably passing about the end engaging the valve stem 6 and is adapted to engage the underside of the upper post 23 and be compressed thereby as the solenoid core reaches the normal upward end of travel and held under compression as long as the solenoid is energized, whereby as soon as the solenoid is deenergized the pressure exerted by the spring plate 25 is sufficient to overcome any residual magnetism residing in the solenoid and impart an initial downward movement to the core 3. It is preferable to construct the solenoid core 3 of a plurality of strips of magnetic metal secured together between outer plates of greater thickness and with the central strip likewise of greater thickness and depending below the end of the core 3 which central plate is provided with the slot 21 for engagement with the arm 18.

In this application of a solenoid it requires greater effort to lift the core 3 to open the valve than it does to hold it open. The lifting power of the coil is determined by the ampere turns of the coil, or lifting power equals coil turns multiplied by amperes. In passing current (amperes) through the coil of a solenoid a certain voltage energy is required which is consumed by the coil and results in the heating of the coil. In a solenoid under continuous use, the heating of the coil and armature, if not sufficient to burn and destroy the coil, will increase the resistance of the wire windings and decrease the magnetic strength of the iron to reduce the flow of current to such an extent that, in this application of the solenoid above described, if the valve were intermittently operated before the coil had cooled, the amount of current passing through the coil would not produce the necessary power to open the valve, if connected in a direct current circuit.

When an alternating current is employed, the core 3 as it enters the coil 26 chokes out a part of the current so that the watts are reduced, reducing the heating of the coil, and when the core 3 is withdrawn from the coil 26 the power to lift the core and open the valve is again available. So that when the commercial lighting system of a building is supplied with alternating current the single coil 26 in the construction illustrated in Figures 1 to 8 inclusive may be connected in the control circuit of a fluid fuel burner and will open the valve when the control calls for heat. The fluid supply is conducted from the source of supply, not shown, through pipe 16 to one side of the valve housing 15 and when the valve 13 is rotated to open, the fluid passes through the passages 8, chamber 7, sleeve 9 into the discharge regulating casing 10 which is provided with a sliding valve head 27 mounted upon a valve stem 28 having screw threaded engagement with the casing 10, passing through a stuffing box 29 and having a tool engaging slot 30 on its outer end whereby its relation to the discharge port 31 in the casing 10 may be determined. The casing 10 on the other side of the port is provided with a pipe 32 screw threaded thereto to lead the fluid fuel to the burner nozzle.

However, if the building is supplied with commercial direct current, such a solenoid would either be inoperative or soon burn out for the reason that the core would not choke out a part of the current as it is drawn into the coil.

This invention contemplates for use with direct current the provision of two coils 33 and 34 mounted within the solenoid casing 2 and connected by a mercury tube switch 35 as shown in the wiring diagram, Figure 11. The mercury tube switch 35 is mounted on the valve operating arm 18 as shown in Figures 9 and 10 and so arranged and connected to the coil 34 that when the valve is closed, the switch 35 is closed and closes a shunt circuit about coil 34. When the control calls for heat the current passes through coil 33, switch 35 and wire 36 to the return line. Coil 33 is constructed to produce sufficient power to open the valve which at the same time opens the switch 35, so that the current then passes through coils 33 and 34 to the return line. The two coils 33 and 34 in series produce a reduction in amperes but still enough power to hold the valve open without heating the coil. When the solenoid is deenergized, the core 3 is released to close the valve, thereby closing the switch 35 shunting coil 34 and coil 33 is available to open the valve when the control circuit is closed through the solenoid. The wiring diagram shown in Figure 12 illustrates another method of employing both coils 33 and 34 in circuit to open the valve and then cutting out coil 34 by connecting coil 33 to the return wire 36 and coil 34 through the mercury tube switch 35 to return wire 36.

The disc valve seat 11 is cemented, soldered or by some other leak proof method, fixed to the end of the block 4. It may be desirable as shown in Fig. 3 to use a gasket 11a to insure the cemented joint against possible leaks.

In a rotatable valve of the type described in which the discs 11 and 13 are formed of steel the contacting lapped surfaces may be given an extremely flat smooth surface and each formed in substantially a perfect plane, so that when the contacting surfaces are thoroughly cleaned and slid one on the other with a slight inward pressure they will take hold as though magnetized. Such a seat in the type of valve illustrated eliminates the necessity of packing about the shaft, enables the valve to be operated equally as well with light and heavy oils and the lapped discs do not allow oil to come between them as the perfect seat presses all oil out as the movable disc is rotated. The spring 17 shown is used to add additional pressure to the discs but need not always be used. The plunger type of valves when used with heavy oils are at times prevented from seating properly and often become sticky, and gummed, thus reducing the efficiency and possibly the operation of the valve.

The spring plate 25, shown in Figure 1, may be so constructed as to be under tension to assist the closing of the ports when the solenoid is de-energized, as shown in Figure 9. In this case the spring plate is provided with a V-shaped portion 25ª adapted to contact the arm 18 as the solenoid core completes its upward movement. This V-shaped portion stiffens the spring and places it under greater tension than normal to overcome the residual magnetism upon de-energizing of the solenoid. The free end of the spring in this case is always in contact with post 23 and therefore will exert a downward push as the solenoid core reaches the lower end of its travel to aid in the final rotation of the disc in closing to prevent its coming to rest just before the ports are brought out of alignment.

It is readily seen that this invention provides a solenoid operated valve with means insuring positive operation with either alternating or direct current. Said means consisting in the elimination of the hazard of residual magnetism rendering the valve inoperative, the prevention of overheating the coil, the complete functioning of all parts upon deenergization of the coil and includes a valve head and seat operating with the same efficiency in various grades of oil and presenting a free moving and sealed valve head eliminating the necessity of packing about the shaft.

What I claim is:

1. A solenoid operated valve including a valve seat having a passageway therethrough, a valve head having a similar passageway therethrough rotatable to bring said passageways into and out of register, a stem for rotating the head, an operating arm upon the stem for imparting rotation thereto, a solenoid core having a lost motion connection with said arm to allow the core to gather momentum before engaging the arm, a solenoid coil adapted to be connected in a controlled electric circuit, and means coacting with said operating arm to impart initial movement to the core when the solenoid is de-energized.

2. A solenoid operated valve including a valve seat having a passageway therethrough, a valve head having a similar passageway therethrough rotatable to bring said passageways into and out of register, a stem for rotating the head, an operating arm upon the stem for imparting rotation thereto, a solenoid core having a lost motion connection with said arm to allow the core to gather momentum before engaging the arm, a solenoid coil adapted to be connected in a controlled electric circuit, means coacting with said operating arm to impart initial movement to the core when the solenoid is de-energized, and means coacting with the said operating arm after the solenoid has been de-energized to insure the valve passageways being rotated out of register.

3. A solenoid operated valve including a valve seat having a passageway therethrough, a valve head having a similar passageway therethrough rotatable to bring said passageways into and out of register, a stem for rotating the head, an operating arm upon the stem for imparting rotation thereto, a solenoid core having a lost motion connection with said arm to allow the core to gather momentum before engaging the arm, a solenoid coil adapted to be connected in a controlled electric circuit, means rendered operative upon energizing of the solenoid coacting with said operating arm to impart initial movement to the core when the solenoid is de-energized, and means coacting with the said operating arm after the solenoid has been de-energized to insure the valve passageways being rotated out of register.

IRA E. McCABE.